United States Patent
Roberts et al.

(10) Patent No.: US 7,651,054 B2
(45) Date of Patent: Jan. 26, 2010

(54) DEVICE, METHOD, AND AIRCRAFT FOR ILLUMINATING IN-FLIGHT OPERATIONS

(75) Inventors: Gregory A. Roberts, Costa Mesa, CA (US); German Von Thal, Santa Maria, CA (US)

(73) Assignee: The Boeing Company, Chicago, IL (US)

( * ) Notice: Subject to any disclaimer, the term of this patent is extended or adjusted under 35 U.S.C. 154(b) by 580 days.

(21) Appl. No.: 11/403,301

(22) Filed: Apr. 13, 2006

(65) Prior Publication Data

US 2009/0140099 A1    Jun. 4, 2009

(51) Int. Cl.
*B64D 39/00* (2006.01)

(52) U.S. Cl. .................................. 244/135 A

(58) Field of Classification Search ............. 244/135 R, 244/1 TD, 135 A; 398/118, 128, 130
See application file for complete search history.

(56) References Cited

U.S. PATENT DOCUMENTS

| 3,917,196 | A | * | 11/1975 | Pond et al. .................... 342/23 |
| 4,025,193 | A | * | 5/1977 | Pond et al. ................... 356/5.1 |
| 5,307,194 | A | * | 4/1994 | Hatton et al. ................ 398/130 |
| 5,530,650 | A | * | 6/1996 | Biferno et al. .............. 701/300 |
| 5,670,942 | A | * | 9/1997 | Lewis .......................... 340/555 |
| 6,266,142 | B1 | * | 7/2001 | Junkins et al. .............. 356/623 |
| 6,347,001 | B1 | * | 2/2002 | Arnold et al. ............... 398/122 |
| 6,528,954 | B1 | * | 3/2003 | Lys et al. ..................... 315/291 |
| 6,559,777 | B1 | | 5/2003 | Martin et al. |
| 7,093,801 | B2 | * | 8/2006 | Schroeder ............... 244/135 A |
| 7,171,126 | B2 | * | 1/2007 | Cicchiello et al. ........... 398/129 |
| 7,475,852 | B2 | * | 1/2009 | Hewitt et al. ............ 244/135 A |
| 2005/0017130 | A1 | | 1/2005 | Shelly et al. |
| 2005/0093718 | A1 | | 5/2005 | Martin |
| 2005/0269455 | A1 | | 12/2005 | Hewitt et al. |
| 2006/0000949 | A1 | * | 1/2006 | Schroeder ............... 244/135 A |
| 2007/0086912 | A1 | * | 4/2007 | Dowling et al. ................. 422/1 |

OTHER PUBLICATIONS

NATO, Allied Tactical Publication ATP-56(A) Air to Air Refueling, Nov. 2000, Annex 10l—National Annex—Netherlands, pp. 10l-1 to 10l-3, Appendix 1 & 2.

* cited by examiner

*Primary Examiner*—Michael R Mansen
*Assistant Examiner*—Brian M O'Hara

(57) ABSTRACT

An device, method, and aircraft are provided for illuminating an in-flight operation, the device, method, and aircraft generating an electromagnetic radiation within the far-violet and ultraviolet spectrum, and thus being imperceptible to the naked eye, compatible with night vision equipment, and undetectable by night vision equipment.

8 Claims, 3 Drawing Sheets

DEVICE, METHOD, AND AIRCRAFT FOR ILLUMINATING IN-FLIGHT OPERATIONS

FIELD OF THE INVENTION

The invention relates generally to in-flight operations involving aircraft and more particularly to providing a device, method, and aircraft for illuminating an in-flight operation, such as fuel transfer, that entails generating an electromagnetic radiation within the far-violet and ultraviolet spectrum.

BACKGROUND OF THE INVENTION

An in-flight operation involves one or more aircraft performing a maneuver or exercise. One example of an in-flight operation is in-flight refueling. In-flight refueling is a strategic method to extend the range and effectiveness of aircraft when it is not feasible or desirable to land for ground refueling. An in-flight refueling operation typically involves a supplying aircraft (e.g., a tanker) and a receiving aircraft (e.g., a fighter, bomber, transport, or command and control aircraft). The supplying aircraft holds a substantially steady flight position while the receiving aircraft maneuvers into a refueling envelope behind and below the supplying aircraft. In one refueling method, the supplying aircraft lowers a boom with an attached refueling nozzle that is maneuvered by an operator to make contact with a refueling receptacle on the receiving aircraft. In a second refueling method, the supplying aircraft releases a refueling hose with an attached drogue within an appropriate range of the receiving aircraft. The receiving aircraft must maneuver so that a probe extending from the receiving aircraft makes contact with the drogue from the supplying aircraft. Present in-flight refueling systems commonly use a camera vision system (e.g., a remote aerial refueling operator (RARO) system as used on the Boeing KDC-10 and KC-767A/J) in which a video camera is pointed at the refueling envelope and a refueling operator views a display to perform operations. A computer system is also commonly used to process and enhance the display images. Sufficient illumination is needed for the video camera so that an operator viewing a display has good visibility of the refueling operation.

One challenge of in-flight refueling is providing sufficient illumination for the RARO system when performing night time in-flight refueling. It is desirable to minimize the use of visible light (e.g., radiation in the electromagnetic spectrum visible to the naked human eye) during a night time in-flight refueling operation. One reason is because it is desired that an observer's attention not be drawn to the refueling operation. For example, an observer on the ground may perceive the visible light on a supplying aircraft during night time at a far distance when the atmosphere is substantially free of cloud cover, fog, dust, or other weather conditions which may obstruct visible light. In another situation, the observer may be in another aircraft instead of on the ground. Thus, there is a need for an illumination system that is imperceptible to the naked eye such that an observer on the ground or in an aircraft would not perceive the illumination being used during the in-flight refueling operation at night time and under substantially clear weather conditions.

A second reason why it is desirable to minimize the use of visible light is because the visible light interferes with night vision equipment (e.g., night vision goggles or night vision imaging systems). During night time operations, pilots wear night vision goggles (NVG). Night vision imaging systems (NVIS) may also be used onboard an aircraft. Visible light interferes with night vision equipment by causing "blooming", loss of sensitivity, and is also destructive to the night vision equipment by over saturating the sensors. Even if night vision goggles are not used, the visible light can "blind" a pilot who looks directly into the light. Because the use of visible light is minimized or eliminated in night time in-flight refueling, there may be insufficient illumination such that the RARO cannot generate a practical image for use by the operator. Thus, there is a need for an illumination system for in-flight refueling that provides sufficient illumination for a camera vision system such as a RARO, and is compatible with night vision equipment.

Another challenge for night time in-flight refueling is to provide illumination that is uniformly incident on the receiving aircraft. Non-uniform illumination can cause glint, shadows, blooming, and glare when viewing the receiving aircraft through the camera and display system. Non-uniform illumination also makes it more difficult for computer systems to enhance images. For example, image enhancement algorithms that improve contrast may bring out detail in a darker part of an image, but may saturate and wash out the brighter parts of the image causing other detail to be lost. Adding to the challenge is the fact that a receiving aircraft comes in different shapes and sizes. When in the refueling envelope, providing uniform illumination incident on a fighter aircraft such as an F-16 may be substantially different than providing uniform illumination for a large command-and-control aircraft such as an E-3 AWACS. Furthermore, not all receiving aircraft have the same location for their refueling receptacles. Some refueling receptacles may be on the centerline of the main fuselage, some are off the centerline (e.g., F-15), and some may be in the nose (e.g., A-10 Warthog). Thus, there is a need for a system that provides illumination that is also configurable to provide uniform lighting over the receiving aircraft and around the refueling receptacle for different types of receiving aircraft.

Although solutions have been offered for illuminating in-flight refueling operations, many challenges still exist. As previously mentioned, radiation in the electromagnetic spectrum visible to the human eye is detectable, causes blooming and may be destructive to night vision equipment. Thus, visible light is not an effective solution. Illumination in the infrared (IR) or near-infrared electromagnetic radiation spectrum has been proposed as a solution that is undetectable to the naked eye. However, it is possible that aircraft or ground forces, also equipped with night vision equipment, may detect the infrared light making the supplying or receiving aircraft a vulnerable target, and thus, compromise the mission. In addition, because night vision goggles are especially sensitive to IR or near-IR radiation, persons wearing night vision goggles may also be "blinded" by too much illumination in the same manner when a person is blinded by headlights of another vehicle.

Therefore, there exists a need for a system that provides illumination that is imperceptible to the naked eye and night vision equipment for in-flight operations such as in-flight refueling. The illumination of the system also needs to be compatible with night vision equipment, and the system should be configurable to uniformly illuminate different types of receiving aircraft for in-flight refueling.

SUMMARY OF THE INVENTION

A device, method, and aircraft for selectively illuminating an in-flight refueling operation between a supplying aircraft and a receiving aircraft is provided. The invention is advantageously compatible and undetectable with night vision equipment, and imperceptible to the naked human eye. The illuminating device comprises at least one emitting device that generates electromagnetic radiation at wavelengths within the far-violet and ultraviolet spectrum. A housing can be provided to host the emitting devices and may be configured to direct the emitting devices to illuminate the receiving aircraft.

In one embodiment, the emitting device generates an electromagnetic radiation between about 370 nanometers (nm) to 420 nm. In other embodiments, each one of the emitting devices may be configured as part of one or more emission banks, such that each emission bank may be individually activated with a selecting device. The illuminating device may also comprise a control device to configure the intensity of the emitting devices.

In accordance with another aspect of the invention, a method for transferring fuel comprises generating an electromagnetic radiation at wavelengths within the far-violet and ultraviolet spectrum, directing the electromagnetic radiation to illuminate the receiving aircraft when the receiving aircraft is in an in-flight refueling envelope, and using the illumination to monitor and control the receiving aircraft position when transferring the fuel from the supplying aircraft to the receiving aircraft. In other aspects of the invention, the method further comprises selecting an emission bank for generating the electromagnetic radiation and configuring the intensity of the electromagnetic radiation.

In accordance with another aspect of the invention, an aircraft equipped to illuminate an in-flight refueling operation between a supplying aircraft and a receiving aircraft comprises an illuminating device attached to the supplying aircraft, a video camera aligned to view the receiving aircraft, and a display device for displaying an image of the receiving aircraft. The illuminating device is adapted to generate electromagnetic radiation at wavelengths within the far-violet and ultraviolet spectrum upon the receiving aircraft when the receiving aircraft is in an in-flight refueling envelope.

The device, method, and aircraft of the invention using an electromagnetic radiation within a far-violet and ultraviolet spectrum is thus advantageous for illuminating an in-flight refueling operation. Furthermore, the inventive aspects of directing, selecting, and configuring the emitting devices advantageously accommodates different types of receiving aircraft and in-flight operations to provide more uniform illumination. Still other advantages of the invention will be apparent to those skilled in the art from the following detailed disclosure.

DETAILED DESCRIPTION OF THE INVENTION

Embodiments of the invention are directed to a device, method, and aircraft for illuminating an in-flight operation. Specific details of various embodiments of the invention are set forth in the following description and in FIGS. 1-4 to provide a thorough understanding of the invention. One skilled in the art will understand that the invention may have other embodiments and this description should not be construed as limited to the embodiments set forth herein.

Figure 1:
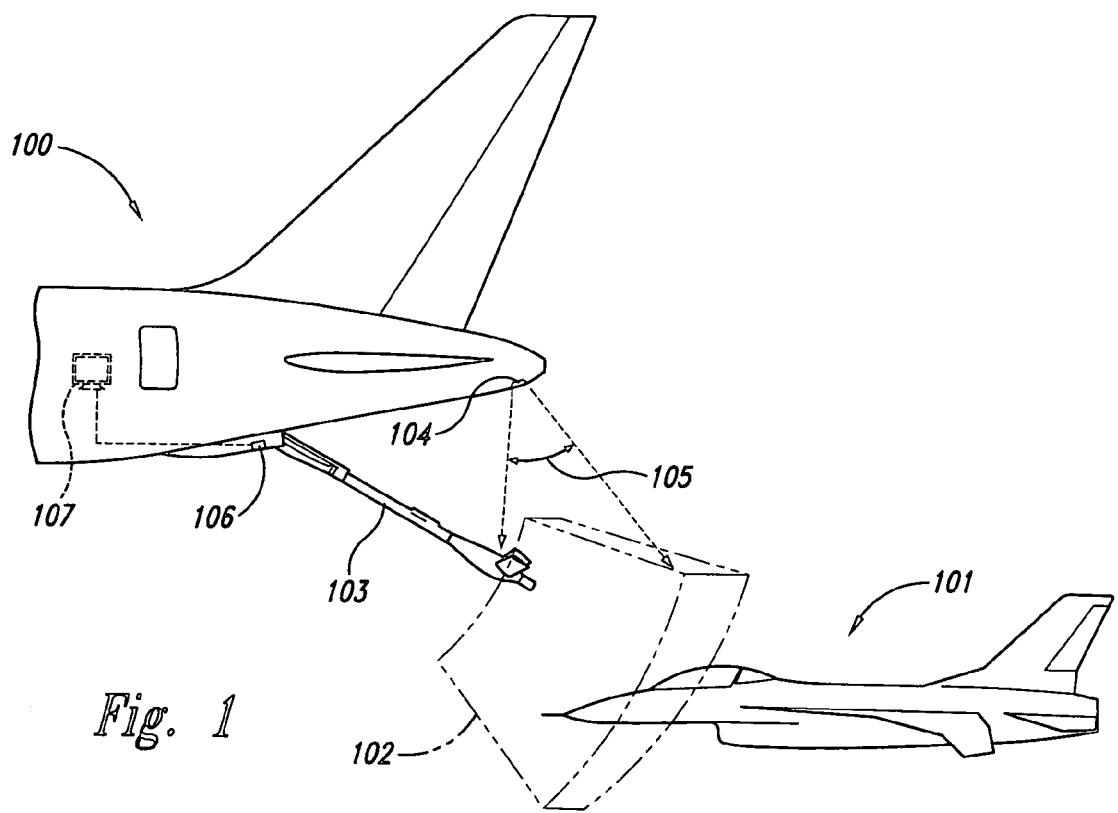
FIG. 1 illustrates a supplying aircraft adapted for an in-flight refueling operation between the supplying aircraft and a receiving aircraft in accordance with one embodiment of the invention.

FIG. 1 illustrates a supplying aircraft 100 adapted to provide illumination for a typical in-flight refueling operation. The supplying aircraft 100 holds a substantially steady flight position while a receiving aircraft 101 maneuvers into a refueling envelope 102. The refueling envelope 102 is an acceptable volume of area, relative to the supplying aircraft 100, in which receiving aircraft 101 must reside in so that a boom 103 can be extended from the supplying aircraft 100 to the receiving aircraft 101 for the refueling operation. The refueling envelope 102 also sets forth the volume of area that must be adequately illuminated for the operation. An illuminating device 104 may be attached to the rear fuselage of the supplying aircraft 100 and adapted to generate an electromagnetic radiation 105 at a wavelength within the far-violet (about 400 nm to 420 nm) and ultraviolet spectrum (about 10 nm to 400 nm). In other words, the illuminating device 104 generates electromagnetic radiation between about 10 nm to about 420 nm. The illuminating device 104 provides sufficient illumination for the volume in the refueling envelope 102. A video camera 106 adapted to sense electromagnetic radiation in the far-violet and ultraviolet (UV) spectrum, may be aligned to view the in-flight operation. The video camera 106 may be a conventional video camera which is generally sensitive to wavelengths between about 370 nm to 420 nm, or a specialized UV camera. One example of a UV camera is a Sony XCD-SX910UV CCD camera which is sensitive to wavelengths between about 200 nm to 380 nm. Images from the video camera 106 are provided on a display device 107 located inside the supplying aircraft 100 to an operator to facilitate positioning of the boom 103, monitoring the transfer of fuel from the supplying aircraft 100 to the receiving aircraft 101, and disengaging the boom 103. In other embodiments, the supplying aircraft 100 may be adapted to illuminate an in-flight refueling operation when a drogue and probe are used. For example, a supplying aircraft may generate an electromagnetic radiation between about 10 nm to 420 nm that is directed to illuminate a hose, drogue, probe, and receiving aircraft. A video camera and display may be used to view and monitor the refueling operation as the supplying aircraft releases a refueling hose, the receiving aircraft maneuvers into position to make contact between the probe and the drogue, and the fuel is transferred from the supplying aircraft to the receiving aircraft.

In one embodiment, the illuminating device 104 may be adapted such that the electromagnetic radiation 105 may be dispersed in arc between about 30 degrees and 60 degrees to illuminate the receiving aircraft 101 in the refueling envelope 102.

In another embodiment, the illuminating device 104 generates electromagnetic radiation 105 in the range between about 370 nm to 420 nm. This range is within the sensitivity of most conventional video cameras, and thus, existing camera vision systems for in-flight refueling and commercially available video cameras may be used. Other embodiments may further comprise a computer system to process and enhance the video images, such as the remote aerial refueling operator (RARO) system. It should be understood that embodiments of the invention may also be used for in-flight operations other than refueling. For operations such as in-flight aircraft inspection, maintenance, cargo transfer, re-armament, or other operations, further embodiments of the invention may have the illuminating device 104 attached to different types of aircraft and in different locations on an aircraft. For example, the illuminating device 104 may be attached to a transport aircraft and adapted to illuminate the cargo doors to allow camera vision monitoring of operations involving cargo or ordinance.

Figure 2:
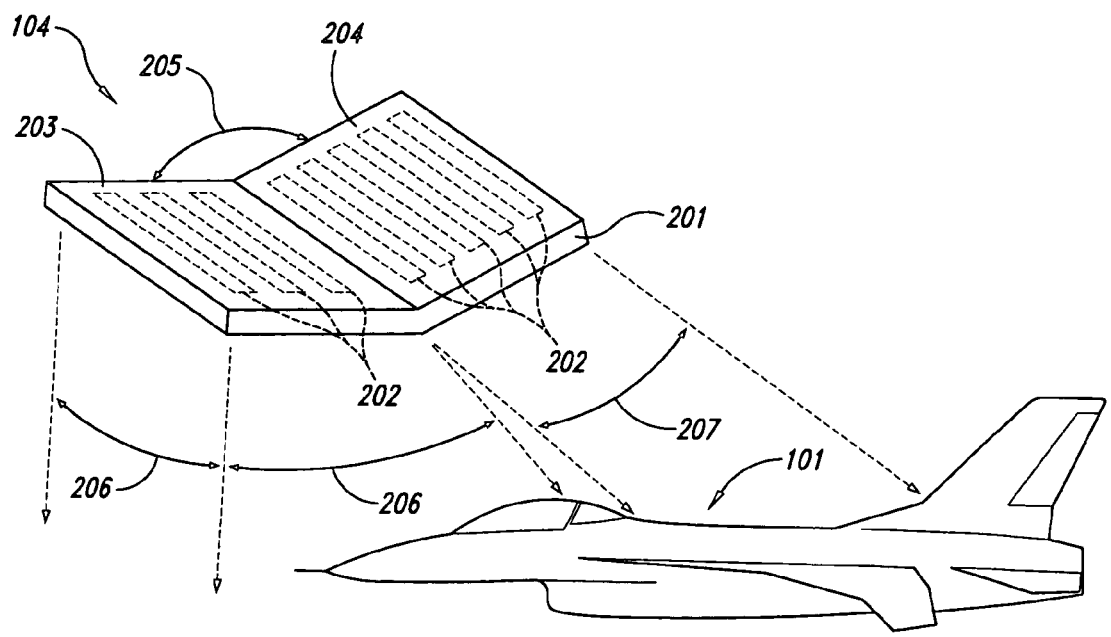
FIG. 2 illustrates one embodiment of an illuminating device of the invention.

FIG. 2 illustrates one embodiment of the illuminating device 104. The illuminating device 104 is comprised of a housing 201 and at least one emitting device 202 for generating electromagnetic radiation within the far-violet and ultraviolet spectrum. In one embodiment, the housing 201 may be comprised of a first planar section 203 and a second planar section 204. Each planar section has at least one emitting device 202 which may be rectangular shaped and arranged in an array for simplicity of manufacturing and wiring. The first planar section 203 and the second planar section 204 are displaced from each other by an angle 205 of between about 120 degrees and 150 degrees. In this embodiment, the first planar section 203 directs the electromagnetic radiation 206 towards the top of the front fuselage section (e.g., canopy area) of a receiving aircraft 101, and the second planar section 204 directs the electromagnetic radiation 207 towards the top of the fuselage midsection (e.g., between the canopy and tail) of the receiving aircraft 101. In one embodiment, the second planar section 204 may house a greater number of emitting devices 202 than the first planar section 203 to uniformly illuminate the receiving aircraft 101 by accounting for the difference in distance between the illuminating device 104 and different sections of the receiving aircraft 101. In one embodiment, the housing 201 may be a rigid structure for simplicity, wherein the angle 205 between first planar section 203 and the second planar section 204 is fixed. In other embodiments, the housing 201 may be hinged, gimbaled or otherwise moveable such that the angle between the first planar section 203 and second planar section 204 may be changed. In yet further embodiments, the housing 201 may have more than two planar sections oriented at different angles, have a curved surface, or be shaped as needed to direct the emitting devices 202 for the specific in-flight operation.

Each emitting device 202 is adapted to generate electromagnetic radiation primarily within the far-violet and ultraviolet spectrum (for example, between about 10 nm to 420 nm). In one embodiment, the emitting device 202 generates electromagnetic radiation between about 370 nm to 420 nm. This range is within the sensitivity of most conventional video cameras and existing camera vision systems for in-flight refueling. In another embodiment, the emitting device 202 may be comprised of a plurality of ultraviolet light emitting diodes (LEDs). An example of an ultraviolet LED is Nichia Corporation ultraviolet LED model NSHU590A which radiates electromagnetic radiation between about 360 nm and 400 nm, with a peak at 375 nm. In one embodiment each ultraviolet LED may be arranged to be as close as possible to an adjacent ultraviolet LED as space permits. This arrangement simplifies a wiring scheme for the plurality of ultraviolet LEDs. The arrangement of the plurality of ultraviolet LEDs of the emitting device 202 is not limited to any particular shape or spacing between ultraviolet LEDs. The emitting device 202 may be different sizes and different shapes to radiate electromagnetic radiation as a floodlight, spotlight, signal light, or marker light. In other embodiments, an emitting device 202 may be comprised of one or more ultraviolet lasers for generating electromagnetic radiation. In another embodiment, an emitting device 202 may be comprised of one or more ultraviolet laser diodes for generating the electromagnetic radiation. An example of an ultraviolet laser diode is Spectra-Physics laser diode LQC375-08E which radiates at about 375 nm. In yet further embodiments, the electromagnetic radiation may be filtered, dispersed, or otherwise configured through the used of external lenses, optical filters, or optical fibers to generate the desired wavelengths. The illuminating device 104 is compatible and non-detectable by infrared night vision equipment because the emitting devices 202 generate electromagnetic radiation outside the sensitivity of night vision equipment. For example, a Night Vision Imaging System (NVIS) is sensitive between about 600 nm and 900 nm. Because the illuminating device 104 radiates well below the range of night vision equipment, the electromagnetic radiation does not cause blooming in the night vision goggles of a pilot. Furthermore, the electromagnetic radiation will not attract the unwanted attention of an observer on the ground using night vision equipment. In yet further embodiments, the emitting devices 202 may be configured such that the electromagnetic radiation is imperceptible to the human eye or night vision equipment from a distance of at least one nautical mile away. The choice of the wavelength of the electromagnetic radiation can take advantage of the atmospheric scattering of short wavelengths, thus greatly attenuating the emission with observer distance.

Figure 3:
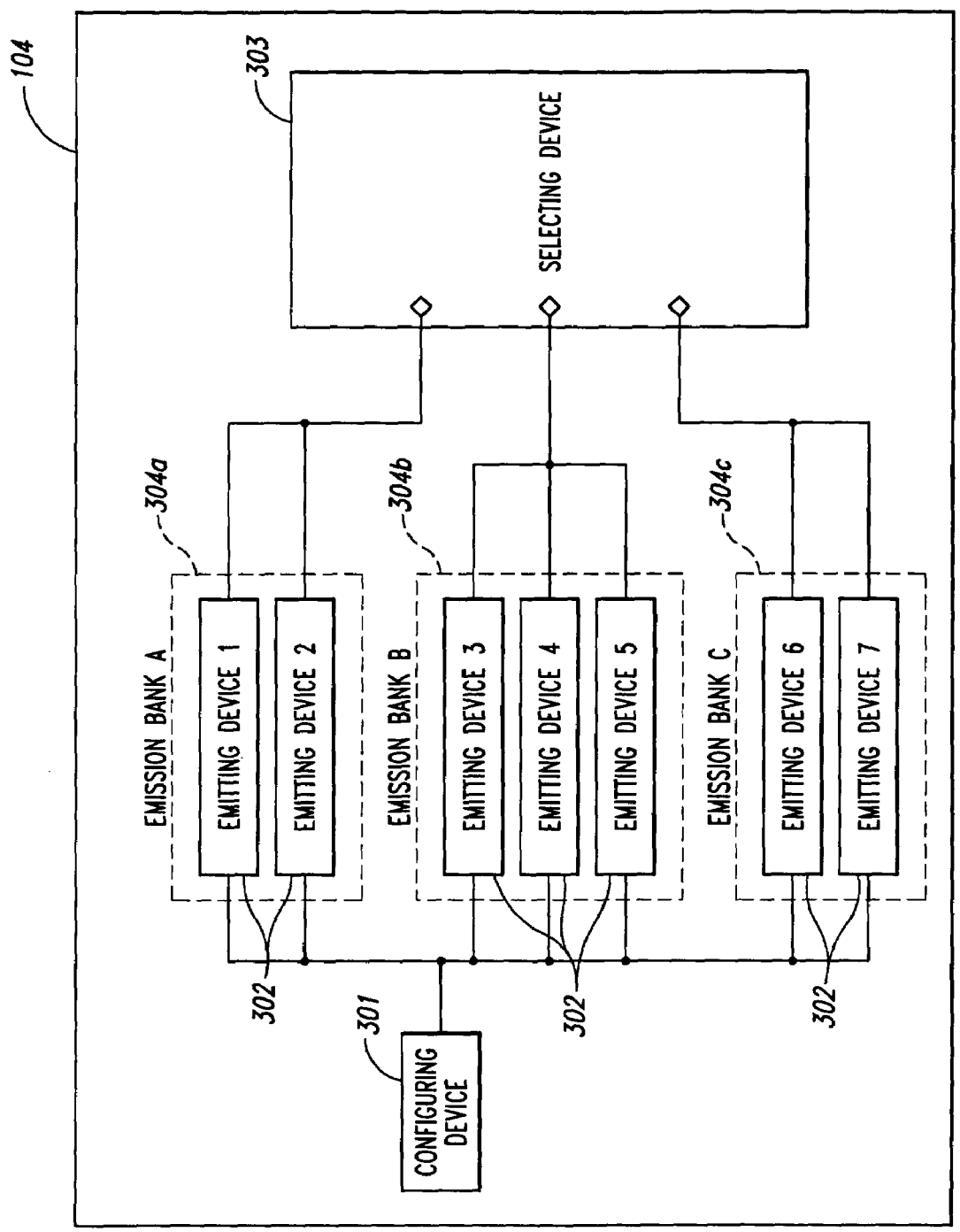
FIG. 3 illustrates a block diagram of another embodiment of an illuminating device of the invention.

FIG. 3 illustrates a block diagram of another embodiment of the illuminating device 104. In this embodiment, the illuminating device 104 further comprises a configuring device 301 for configuring each one of the emitting devices 302 separately to adjust the intensity of the electromagnetic radiation generated. The configuring device 301 may be implemented with a variety of means such as power limiting devices, power control circuits, or computer controlled circuits and switches. The intensity of the illumination for the operation may be adjusted for more illumination or less illumination as necessary for optimally viewing a display image of the operation through a camera vision system.

In yet another embodiment, the illuminating device 104 may further comprise a selecting device 303 for activating an "emission bank" 304. An emission bank 304 is a distinct group of emitting devices 302 that are configured to be selected as a group for generating electromagnetic radiation. Each individual emitting device 302 may be configured to one or more emission banks 304. For example, FIG. 3 shows a first, second, and third emission bank 304a, 304b, and 304c which are labeled in the drawing as emission bank A, emission bank B, and emission bank C respectively. If the first emission bank 304a is selected, then only the group of emitting devices 302 that are configured to emission bank 304a are activated to generate electromagnetic radiation. The selecting device 303 may be implemented with a variety of means such as manually activated electrical switches, automatic switches, or a computer controlled switching circuit. Note that the configuration of emitting devices 302 to an emission bank 304 is not limited to physically adjacent emitting devices 302. Furthermore, a particular emitting device 302 may belong to more than one emission bank 304. For example, a subset of the emitting devices 302 of second emission bank 304b may also be configured to a separate emission bank 304. Or a subset of emitting devices 302 from first emission bank 304a and a subset of emitting devices 302 from third emission bank 304c could be configured to a separate emission bank 304. In another embodiment, using the configuring device 301 and selecting device 303 allows the illuminating device 104 to be spectrally reconfigurable. For example, first emission bank 304a may be configured with emitting devices 302 that substantially radiate about 420 nm, second emission bank 304b may be configured with emitting devices 302 that substantially radiate about 370 nm, and third emission bank 304c may be configured with emitting devices 302 that radiate throughout a range from 370 to 420 nm with a particular distribution for each wavelength. Because each emission bank 304 may be selected individually, the illuminating device 104 may be spectrally configurable as to a particular wavelength and its intensity. These embodiments of configuring the intensity of the emitting devices 302 and selecting the emission banks 304 advantageously allows for adjusting the illuminating device 104 for uniformly illuminating different types of receiving aircraft in an in-flight refueling operation, or controlling the illumination for the specific needs of other in-flight operations.

Figure 4:
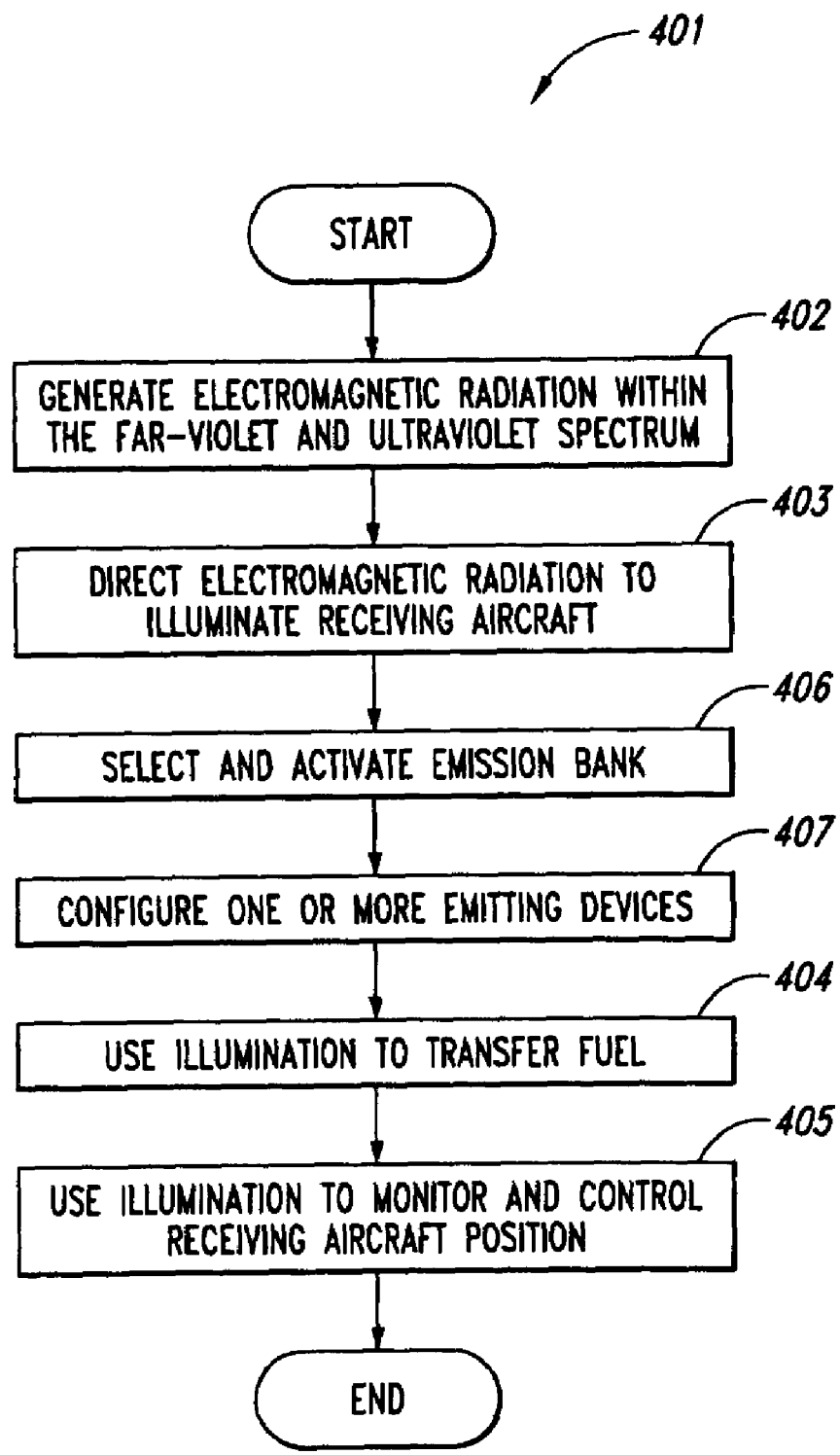
FIG. 4 illustrates a flowchart for a method for transferring fuel from a supplying aircraft to a receiving aircraft in an in-flight refueling operation.

FIG. 4 illustrates a method 401 for transferring fuel from a supplying aircraft to a receiving aircraft. In-flight fuel transfer requires careful preparation and execution. Proper illumination is particularly helpful for refueling in a low light environment. However, as indicated previously, it is desired that the illumination preferably does not attract unwanted attention. Accordingly, the method comprises an operation 402 for generating electromagnetic radiation within the far-violet and ultraviolet spectrum. Another operation 403 comprises directing the electromagnetic radiation to the receiving aircraft for selectively and uniformly illuminating the receiving aircraft for the refueling operation. Using the illumination, an operation 404 is performed to couple the supplying aircraft and receiving aircraft, and transfer fuel from the supplying aircraft to the receiving aircraft. The on-going fuel transfer and positions of the supplying and receiving aircraft are continuously monitored in another operation 405 until the fuel transfer is completed and the aircraft are decoupled. In another embodiment of the method, a further operation 406 comprises selecting an emission bank to activate a pre-established group of emitting devices. Still yet another embodiment comprises an operation 407 for configuring one or more emitting devices to adjust the power of the electromagnetic radiation generated.

A device, method, and aircraft for illuminating an in-flight refueling operations using electromagnetic radiation within the far-violet and ultraviolet spectrum have been disclosed. The scope of the invention is not limited by the specific embodiments disclosed, and one skilled in the art will understand there are other modifications and embodiments of the invention not described, but are in the scope of the claims that follow.

What is claimed is:

1. An illuminating device for use during one or more in-flight operations involving two or more aircraft, the illuminating device comprising:
   a housing disposed on a first aircraft, wherein said housing comprises a first planar section and a second planar section, said first planar section being rigidly displaced from said second planar section at a fixed angle between about 120 degrees and 150 degrees;
   a plurality of emitting devices disposed in said housing and configured to selectively generate an electromagnetic radiation between about 370 nanometers and about 420 nanometers, wherein at least one of said plurality of emitting devices is disposed in said first planar section and at least one of said plurality of emitting devices is disposed in said second planar section;
   a first emission bank disposed in said housing, said first emission bank having a first group of emitting devices from said plurality of emitting devices, said first group disposed in said first planar section and said second planar section, wherein said first emission bank is configured to selectively generate an electromagnetic radiation between about 370 nanometers and about 420 nanometers such that said electromagnetic radiation is directed to be uniformly incident on a second aircraft during a first in-flight operation;
   a second emission bank disposed in said housing, said second emission bank having a second group of emitting devices from said plurality of emitting devices, said second group disposed in said first planar section and said second planar section, wherein at least one of said plurality of emitting devices is configured to both said first emission bank and said second emission bank, and wherein said second emission bank is configured to selectively generate an electromagnetic radiation between about 370 nanometers and about 420 nanometers such that said electromagnetic radiation is directed to be uniformly incident on a third aircraft during a subsequent second in-flight operation, the third aircraft being a different type from the second aircraft; and
   a selecting device for activating one of said first emission bank and said second emission bank.

2. The illuminating device of claim 1, wherein said first emission bank is configured such that said electromagnetic radiation is directed to be uniformly incident on said second aircraft when said second aircraft is in an in-flight refueling envelope with said first aircraft.

3. The illuminating device of claim 1, wherein at least one emitting device is comprised of a plurality of ultraviolet light emitting diodes.

4. The illuminating device of claim 1, wherein at least one emitting device is comprised of at least one ultraviolet laser diode.

5. The illuminating device of claim 1, further comprising a control device for controlling an intensity of at least one emitting device.

6. The illuminating device of claim 1, wherein said housing is configured such that at least one emitting device disperses said electromagnetic radiation in an arc between about 30 degrees and about 60 degrees.

7. The illuminating device of claim 1, wherein said illuminating device is spectrally reconfigurable.

8. The illuminating device of claim 1, wherein said electromagnetic radiation from said first emission bank is directed to be incident on at least one of a refueling receptacle and probe of the second aircraft during the first in-flight operation, and wherein said electromagnetic radiation from said second emission bank is directed to be incident on at least one of a refueling receptacle and probe of the third aircraft during the subsequent second in-flight operation.

* * * * *

UNITED STATES PATENT AND TRADEMARK OFFICE
CERTIFICATE OF CORRECTION

PATENT NO. : 7,651,054 B2  Page 1 of 1
APPLICATION NO. : 11/403301
DATED : January 26, 2010
INVENTOR(S) : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-third Day of November, 2010

David J. Kappos
*Director of the United States Patent and Trademark Office*